US007774589B2

(12) United States Patent
Corrao et al.

(10) Patent No.: US 7,774,589 B2
(45) Date of Patent: Aug. 10, 2010

(54) SYSTEM, METHOD AND PROGRAM FOR SELECTIVITY REBOOTING COMPUTERS AND OTHER COMPONENTS OF A DISTRIBUTED COMPUTER SYSTEM

(75) Inventors: Ann M. Corrao, Raleigh, NC (US); Vidhi A. Desai, Bellevue, WA (US); Michael R. Ensley, Raleigh, NC (US); Todd D. Mytkowicz, Boulder, CO (US); Brian J. Snitzer, Lancaster, PA (US); Nam Tran, Chicago, IL (US)

(73) Assignee: International Business Machines Corporation, Armonk, NY (US)

( * ) Notice: Subject to any disclaimer, the term of this patent is extended or adjusted under 35 U.S.C. 154(b) by 601 days.

(21) Appl. No.: 11/693,982

(22) Filed: Mar. 30, 2007

(65) Prior Publication Data

US 2008/0244253 A1 Oct. 2, 2008

(51) Int. Cl.
*G06F 15/177* (2006.01)
*G06F 13/00* (2006.01)
(52) U.S. Cl. .............. 713/1; 713/2; 713/100; 709/220; 709/221; 710/104
(58) Field of Classification Search ........ 713/1, 713/2, 100; 709/220, 221; 710/104
See application file for complete search history.

(56) References Cited

U.S. PATENT DOCUMENTS

| 5,864,698 | A * | 1/1999 | Krau et al. ............ 713/2 |
| 6,526,567 | B1 | 2/2003 | Cobbett et al. |
| 6,671,802 | B1 | 12/2003 | Ott |
| 7,181,604 | B2 * | 2/2007 | King et al. .......... 713/1 |
| 7,188,237 | B2 * | 3/2007 | Zhou et al. .......... 713/2 |
| 2004/0162898 | A1 * | 8/2004 | Rich .............. 709/224 |
| 2006/0075001 | A1 * | 4/2006 | Canning et al. ........ 707/203 |
| 2006/0080520 | A1 * | 4/2006 | Dickenson .......... 711/170 |
| 2008/0172553 | A1 * | 7/2008 | Childress et al. ...... 713/2 |

OTHER PUBLICATIONS

Candea et al., "Improving Availability with Recursive Microreboots: a Soft-State System Case Study", Performance Evaluation, vol. 56, Issues 1-3, Mar. 2004, pp. 213-248, Dependable Systems and Networks—Performance and Dependability Symposium (DSN-PDS) 2002.
Fox et al., "Combining Statistical Monitoring and Predictable Recovery for Self-Management", WOSS '04, Oct. 31-Nov. 1, 2004, Newport Beach, CA, pp. 49-53.
Heath et al., "Improving Cluster Availability Using Workstation Validation", Department of Computer Science, Rutgers University, Piscataway, NJ, 2002, 11 pages.
Demsky et al., "Automatic Detection and Repair of Errors in Data Structures", OOPSLA '03, Oct. 26-30, 2003, Anaheim, California, pp. 78-95.

* cited by examiner

*Primary Examiner*—Abdelmoniem Elamin
(74) *Attorney, Agent, or Firm*—Arthur J. Samodovitz (57) ABSTRACT

Selectively rebooting components of a computer system. One or more tables which list respective costs to reboot the components and respective likelihoods that reboots of the respective components will correct respective problems with the computer system are generated. Each of the costs is based on a time to reboot or delays caused by the reboot of the respective component. In response to a subsequent problem with the computer system, an order to reboot components of the computer system is determined from the table based on the costs and likelihoods that the reboot will correct the problem, such that a component of the computer system characterized by a relatively low cost and high likelihood to correct the problem will be rebooted before another component characterized by a relatively high cost and low likelihood to correct the problem. The tables are updated through actual experience.

9 Claims, 6 Drawing Sheets

FIG. 5B

SYSTEM, METHOD AND PROGRAM FOR SELECTIVITY REBOOTING COMPUTERS AND OTHER COMPONENTS OF A DISTRIBUTED COMPUTER SYSTEM

FIELD OF THE INVENTION

The present invention relates generally to computer systems, and more specifically to selective rebooting of computers and other components of a distributed computer system.

BACKGROUND OF THE INVENTION

Known distributed computer systems typically include multiple computers such as application servers (including e-commerce servers and other web servers, database servers, etc.) firewalls, routers and/or switches. A web server interfaces to client computers via the Internet to provide some type of service to the client computers. An e-commerce server is a web server that enables advertising, information about products and sale of products via the web. Other types of application servers interface to client computers via some type of network to make the respective applications available to the client computers. Often times, a web server or other type of application server accesses a database server to obtain data such as web pages needed by the client computers. A firewall is typically connected between a server and the Internet to filter out unwanted messages, such as spam, viruses, worms, etc., attempting to enter into or exit from a network containing the server.

A failure in one computer may impact other computers in the distributed computer system. For example, if a user of a client computer cannot utilize a web application hosted by a web server, the problem can be in the firewall which separates the web server from the Internet, the web application server itself, the web server operating system, micro code or hardware, a database server used by the web server to obtain data needed by the client computer, or within a sub module of the web application server. When a failure of unknown origin occurs, it was known to reboot all of the computers and their software involved in providing the service to the client computer, one-by-one, to attempt to fix the problem. It was also known to reboot the computers and their software in an order determined by an administrator, from the most likely cause of the problem to the least likely cause of the problem. It was also known to reboot the computers and software in an order determined by an administrator, from the easiest/fastest computer and its software to reboot to the most difficult/slowest computer and its software to reboot.

It was also know to perform "micro-reboots" of separate applications of a server, as well as entire computers and other hardware devices such as routers, switches and firewalls.

A document entitled "Improving Availability with Recursive Microreboots: A Soft-State System Case Study", by George Candea, James Cutler, and Armando Fox, published by Stanford University in 2004 discloses capturing system information in an f-map, which has system components as nodes and fault-propagation paths as edges. Two phases are then used for analyzing system information and preparing a recovery map. During the first phase, a map of interactions between components is drafted, based on injecting faults into an operational system and determining the outcome. During the second phase, the system observes naturally occurring faults and the reaction of the system to them, creating a map of the impact of recovery events as observed in the system.

An object of the present invention is to reboot computers and other components of a distributed computer system in an optimum order to expeditiously identify and fix a problem component in the distributed computer system.

SUMMARY

The present invention resides in a computer system, method and program for selectively rebooting components of a computer system. One or more tables which list respective costs to reboot the components and respective likelihoods that reboots of the respective components will correct respective problems with the computer system are generated. Each of the costs is based on a time to reboot or delays caused by the reboot of the respective component. In response to a subsequent problem with the computer system, an order to reboot components of the computer system is determined from the table based on the costs and likelihoods that the reboot will correct the problem, such that a component of the computer system characterized by a relatively low cost and high likelihood to correct the problem will be rebooted before another component characterized by a relatively high cost and low likelihood to correct the problem. A first component in the order is rebooted. After rebooting the first component in the order, an extent to which the reboot of the first component corrected the problem is determined, and the one or more tables are updated accordingly. In response to a subsequent problem with the computer system, an order to reboot components of the computer system is determined from the one or more updated tables based on the costs and likelihoods that the reboot will correct the problem, such that a component of the computer system characterized by a relatively low cost and high likelihood to correct the problem will be rebooted before another component characterized by a relatively high cost and low likelihood to correct the problem.

According to a feature of the present invention, components are arranged hierarchically as children components and/or parent components. The children components of each parent component impact performance of their parent component. In response to the subsequent problem with the computer system, the determination from the table of an order to reboot components of the computer system is also based on whether a sibling component of the component which has a relatively low cost and high likelihood to correct the problem was rebooted in response to the first problem, and failed to correct the problem.

BRIEF DESCRIPTION OF THE DRAWINGS

FIG. 4 (A-F) is a numerical example of use of the micro reboot optimization program of FIG. 2 for a portion of the distributed server system of FIG. 1 to determine an optimum order to reboot hardware and software components of the portion of the distributed server system.

FIG. 5 (A-B) form a flowchart illustrating an alternate embodiment of programs within the infrastructure management server 30 of FIG. 1.

DETAILED DESCRIPTION OF THE PREFERRED EMBODIMENTS

Figure 1:
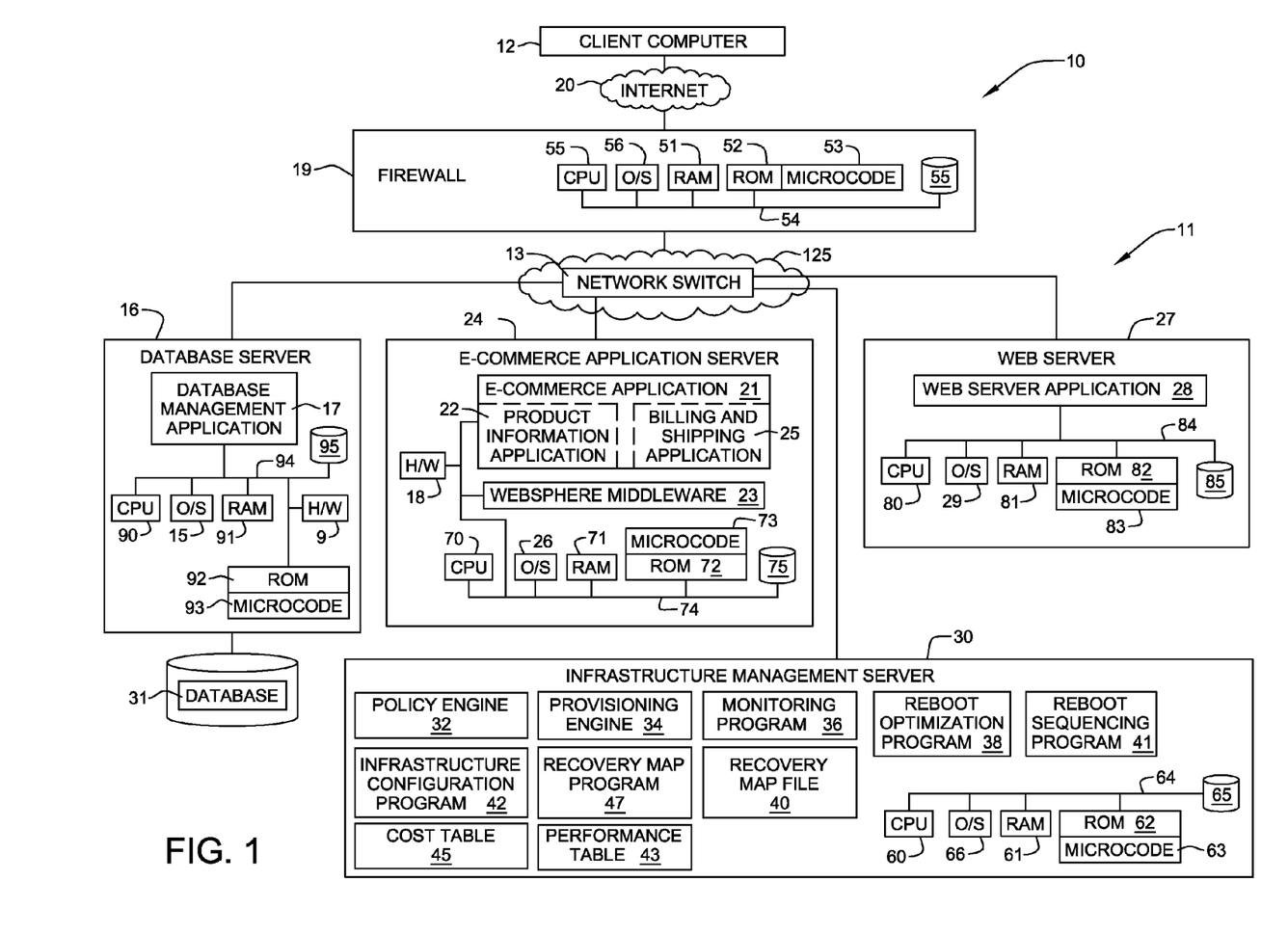
FIG. 1 is a block diagram of a distributed computer system, including a distributed server system, and an infrastructure management server according to the present invention to selectively reboot components of the distributed server system to expeditiously correct a problem with the distributed server system.

The present invention will now be described in detail with reference to the drawings. FIG. 1 illustrates a distributed computer system generally designated 10. Distributed computer system includes a client computer 12 connected to a network 20 such as the Internet, a private frame-relay network or Virtual Private Network ("VPN") based access, and a distributed server system 11. Distributed server system 11 includes an application server such as an e-commerce server 24 which resides on a local network 125 such as an intranet or a LAN segment, and executes one or more applications such as e-commerce application 21, middleware application 23 (such as IBM Websphere application) and an operating system 26 such as Unix (tm licensed by X/Open Company, LTD.) operating system. The e-commerce application 21 comprises a product information application 22 and a billing and shipping application 25. Application server 24 also includes a known CPU 70, RAM 71, and ROM 72 (with microcode 73) on a common bus 74, and storage 75.

A firewall 19 connects the local network 125 to network 20. Firewall 19 includes a known CPU 50, RAM 51, and ROM 52 (with microcode 53) on a common bus 54, and storage 55.

Distributed server system 11 also includes a web server 27 which executes a web application 28 and an operating system 29. Web server 27 also includes a known CPU 80, RAM 81, and ROM 82 (with microcode 83) on a common bus 84, and storage 85.

Distributed server system 11 also includes a database server 16 which is connected to network 125 via network switch 13. Database server 16 stores data such as web pages for application 21 within the application server 24 and web application 28 within the web server 27 to provide to client computer 12 upon request. Database server 16 also includes a known CPU 90, RAM 91, and ROM 92 (with microcode 93) on a common bus 94, and storage 95.

A network switch 13 of local network 125 interconnects firewall 19 to e-commerce server 24, database server 16, web server 27 and infrastructure management server 30.

FIG. 1 also illustrates an infrastructure management server 30 in which the present invention is incorporated. Infrastructure management server 30 also includes a CPU 60, RAM 61, and ROM 62 (with microcode 63) on a common bus 64, and storage 65. Infrastructure management server 30 also comprises a policy engine or program 32, a provisioning engine or program 34, a monitoring program 36, a micro reboot optimization program 38, a recovery map file 40, a recovery map program 47, a micro reboot sequencing program 41 and an infrastructure configuration program 42. Programs 32, 34, 36, 38, 47, 41 and 42 are stored in storage 65 for execution by CPU 60 via RAM 61.

The policy program 32 specifies the customer needs, including service level obligations to the customer, and conditions under which the customer will pay for additional computer infrastructure. The policy program 32 provides such specifications to the provisioning program 34 for compliance.

The provisioning program 34 executes changes within the infrastructure such as addition of a server to improve performance, alteration of quality of service characteristics, expansion of storage for an application, etc.

The micro reboot optimization program 38 determines an optimum order to reboot components of distributed computer system 10. As explained in more detail below, program 38 considers the cost or time to reboot each component and the likelihood that the reboot will solve the overall problem. Hardware components (such as computers, firewalls, routers, network switches and load balancers) and software components (such as operating systems, applications, middleware, etc.) can be rebooted separately from each other.

The micro reboot sequencing program 41 executes the reboots of components of distributed computer system 10 such as firewall 19, application 21 (including its application 22 and application 25 components), middleware program 23, operating system 26, application server 24, web application 28, web server 27, network switch 13, database management program 17, database server 16, operating system 15, database server hardware (including micro code) and database 31, according to the sequence determined by optimization program 38.

The monitoring program 36 monitors component and system level performance before and after reboot of each component of the overall infrastructure. This indicates how effective was the reboot in fixing the problem. Monitoring program 36 monitors component level performance by issuing queries directly to the component and observing whether the response matches the anticipated response, and by timing the response. Monitoring program 36 monitors system level performance by issuing queries to the top level application or interface for the system, and comparing the response to the anticipated response, as well as by observing the time required for the system to respond. Then, monitoring program 36 determines, based on the change in performance due to each reboot, whether the reboot of the component is deemed to have fixed the problem. Monitoring program 36 makes this determination by issue queries to the top level system application and determining whether the response matches the anticipated response and if it occurs within the time frame expected for this application.

The infrastructure configuration program 42 helps to build an initial recovery map (stored as recovery map file 40 for application 21, application 23, web application 28 and each other application in the distributed server system 11, as follows. Program 42 identifies the servers, routers, firewalls, storage devices and load balancers within the distributed server system 11, and the relationship of these hardware components to applications 21, 23 and 28, as follows. For example, program 42 determines which applications (and instances of the same application) execute on which servers, which storage servers and database management programs provide data for which applications, which firewalls interface to which networks, which network switches interface to which servers, and which load balancers send traffic to which applications. Program 42 determines these configurations by any of various known methods, such as making requests for configuration information from each application, server and router, and logs to determine system interactions, and by SNMP polling, examination of router tables and neighboring components, or examining manually-created seed files specifying the interactions between the hardware and software components. Program 42 records in recovery map file 40, the configuration information that it obtains.

Based on the initial recovery map in file 40, the optimization program 38 generates a hierarchical tree structure representing the components of distributed server system 11 and their hierarchical relationship insofar as which components are dependent on which other components to function normally. The tree structure also decomposes a "service" into its constituent parts, such as an e-commerce service decomposed into e-commerce application server 24 and database server 16, and the software and hardware components within server 24 and server 16. In other words, to provide the e-commerce service to a client requires operation and use of both application server 24 and database server 16, including their hardware and software components.

Figure 2:
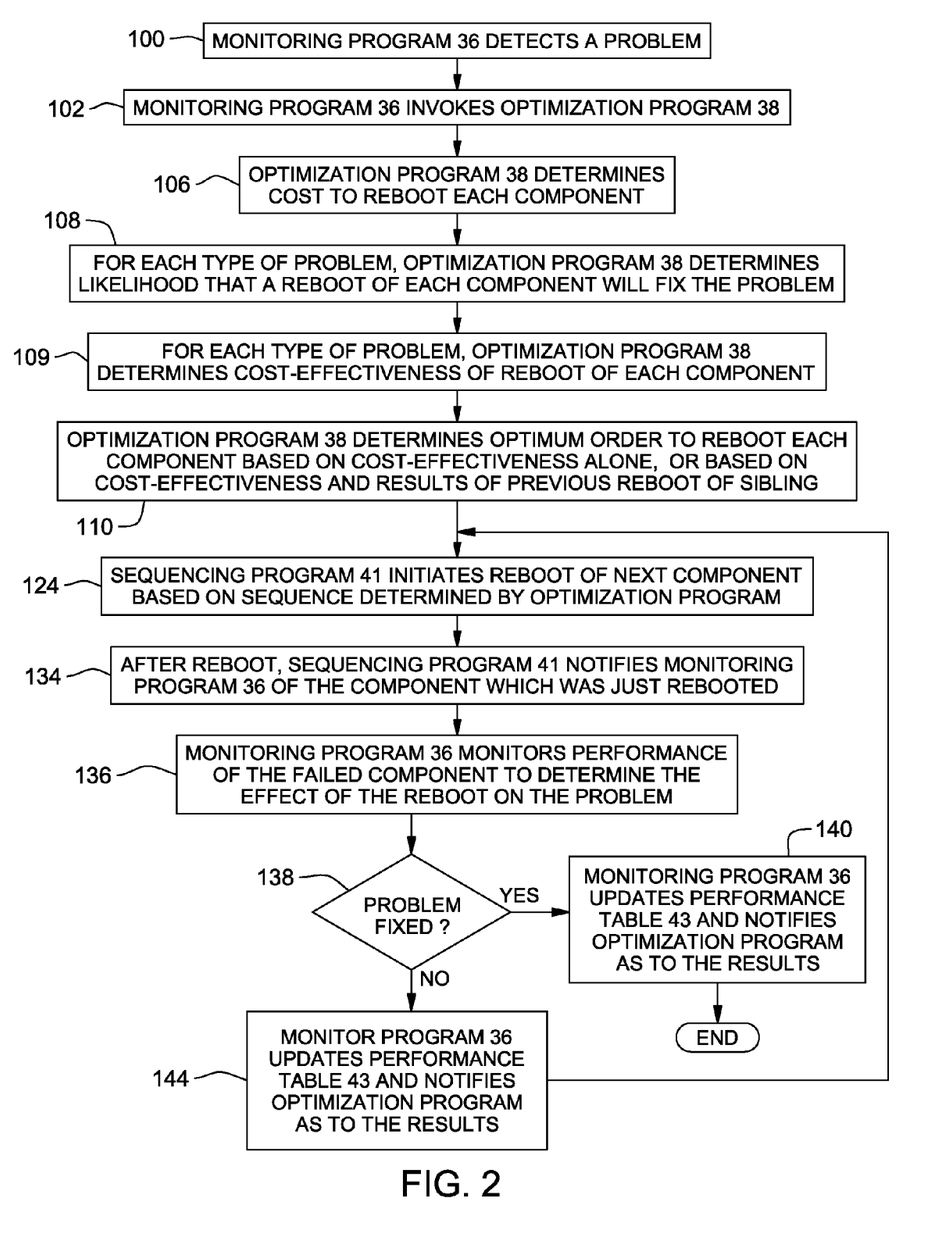
FIG. 2 is a flow chart of programs within an infrastructure management server 30, including a micro reboot optimization program, according to the present invention, to determine an optimum order to reboot components within the distributed server system of FIG. 1.

FIG. 2 illustrates the foregoing programs within infrastructure management server 30 in more detail, according to one embodiment of the present invention. In step 100, the monitoring program 36 detects a failure or poor performance of an application, such as application 21. Monitoring program 36 detects a failure or poor performance of application 21 by observing that either the application fails to respond as expected or does not respond in the expected time frame. In response, monitoring program 36 invokes the micro reboot optimization program 38 (step 102) to determine an optimum order of rebooting the hardware and software components that enable performance of application 21, as follows. Optimization program 38 determines a "cost" to reboot each hardware (including micro code) and software component in the distributed server system 11; the cost determines in part the reboot sequence (step 106). (As explained below, another factor in the determining the reboot sequence is the likelihood that the reboot of the component will correct the problem.) Optimization program 38 determines the cost to reboot each hardware and software component in the distributed server system as follows. Optimization program 38 previously assigned an initial cost to reboot each component in the distributed server system 11 based on an estimate, entered by an administrator through his or her experience, of the time required to perform the reboot. If there is no backup for the component, the time required to perform the reboot is the "down" time for the hardware or software. If there is a backup or redundant component for the component, the cost to reboot the component is based on the delay degradation to the system performance when the component is rebooting. In the case of a redundant component which is being rebooted, typically the "cost" to reboot is substantially less than the cost to reboot a non redundant component. The following is an example of how the cost to reboot a redundant component is determined:

When each component is subsequently rebooted, optimization program 38 updates the cost to reboot the component based on the actual time to reboot (in the case of a non redundant component) or extra delay or degradation caused by the reboot (in the case of a backup or redundant component), as determined by the monitoring program 36. Optimization program 38 records the cost to reboot each component in a Cost Table 45, as follows:

COST TABLE 45

| Component Type | Component ID | Time to Reboot | Cost to Reboot |
| --- | --- | --- | --- |
| WAS Server | | two Minutes | 2.1 |
| DB2 Server | | five Minutes | 4.8 |
| AIX Server | | twenty minutes | twenty |

Next, the reboot optimization program 38 determines the likelihood that a reboot of a specific component will correct the current problem. Initially, for each Problem Type, such as slow web site response, Server Error or High CPU, an administrator determines by experience an identity of each Rebooted Component that could possibly correct the problem by being rebooted. Then, the administrator enters into a Performance Table 43 the identity of such Rebooted Component, an identity of which failed component (i.e. completely or partially degraded component) whose performance may be improved by rebooting the Rebooted Component and an estimation of the Amount of Improvement of the failed component resulting from rebooting the component (step 108). Later, as described below, during actual operation, monitoring program 36 updates the foregoing entries in the Performance Table 43 based on actual results of each reboot and its effect on other components for each type of problem. The actual results will indicate for each problem and rebooted component, which component, if any, for which Performance was Improved and the Amount of Improvement. Then, based on a comparison of the Amount of Improvement to predefined thresholds, monitoring program 36 determines the Effectiveness of Reboot of each component for correcting each type of problem. For example, if the amount of improvement due to rebooting a component brings the performance to 100% or more of a satisfactory level/metric, then the reboot of the component is deemed to be 100% effective, if the amount of improvement brings the performance to 90% of a satisfactory level/metric, then the reboot is deemed to be 90% effective, if the amount of improvement brings the performance to 80% of a satisfactory level/metric, then the reboot is deemed to be 80% effective etc. Every time a reboot occurs, the optimization program 38 updates the Cost Table 45 and Performance Table 43, and this typically adjusts the Effectiveness of Reboot score.

PERFORMANCE TABLE 43

| Problem Type | Rebooted Component | Failed Component(s) in which Performance was Improved | Amount of Improvement | Effectiveness of Reboot |
| --- | --- | --- | --- | --- |
| High CPU above 90% | WebSphere | Yes | CPU Down 80% | 100% |
| High CPU above 90% | DB2 | No | CPU Down 10% | 50% |
| High CPU above 90% | Server | Yes | CPU Down 90% | 100% |

Next, optimization program 38 determines the Cost-Effectiveness score of rebooting each component in system 11 for each type of problem that may be encountered (step 109). To determine the Cost-Effectiveness score of each reboot, optimization program 39 considers the following factors:

a) Cost, i.e. time to reboot each component (in the case of a non redundant component) or delays or degradation in performance (in the case of a redundant component) as specified in Cost Table 45; and b) (Probable) Effectiveness of Reboot, as specified in Performance Table 43, i.e. likelihood that the reboot of the component will correct the current problem and amount of improvement.

The following is an example of one algorithm to determine the Cost-Effectiveness score of rebooting each component in system 11 for each type of problem:

Cost Effectiveness=(1−Normalized Cost)×Effectiveness of Reboot.

where the Normalized Cost is the Time to Reboot recorded in Table 45 normalized as a percentage, of the ratio to the longest Time to Reboot.

Next, the optimization program 38 determines the optimum order to reboot each component in the case of a failure within the distributed server system 11 such as an inability to utilize application 21 (step 110). In this embodiment of the present invention, the optimum order of rebooting each component is the order of Cost Effectiveness scores, i.e. the component with the highest Cost-Effectiveness score is rebooted first, and if that does not succeed in correcting the problem, the component with the second highest Cost Effectiveness score is rebooted second, and if that does not succeed in correcting the problem, the component with the third highest Cost-Effectiveness score is rebooted third, etc. If the Cost Effectiveness score of two components is the same, then program 38 determines their relative order of rebooting randomly.

The following is an example where (i) there is a problem with application 21, (ii) the likelihood that the database management application 17 has failed (and a reboot of application 17 will correct the problem with application 21) is approximately the same as the likelihood that firewall 19 has failed (and a reboot of firewall 19 will correct the problem with application 21), (iii) the likelihood that any other component has failed (and a reboot of any other component will correct the problem with application 21) is much lower than the likelihood that the database management application 17 or firewall 19 has failed (and a reboot of application 17 or firewall 19 will correct the problem with application 21), and (iv) the cost to reboot firewall 19 is lower than the cost to reboot database management application 17. In this example, optimization program 38 will determine that firewall 19 should be rebooted first, and if that does not fix the problem, then database management application 17 should be rebooted next, etc. Next, optimization program 38 notifies reboot sequencing program 41 to reboot the components in the optimum order determined by the optimization program 38, to first reboot firewall 19, and if that does not fix the problem with application, to reboot application 17 next.

Program 41 initiates the reboot of each component, one-by-one, by signaling for a component restart through a remote script, or in the worst case, by cycling power to the component (step 124). Program 41 notifies monitoring program 36 after the reboot of the first component in step 124 is completed, and provides the identity of the first component which was rebooted, for example, firewall 19 (step 134). Immediately after the reboot of the component in step 124, monitoring program 36 monitors the performance of the failed component in distributed server system 11, and determines and records whether the reboot of the component in step 124 corrected the problem, in whole or in part (decision 136). Typically, the performance of the application for which a problem was noted is deemed to have been corrected if its performance is restored to an acceptable level. If so (decision 138, yes branch), then monitoring program 36 records in Performance Table 43 the identity of the application, system or service whose performance has been improved, the amount of improvement and the component whose reboot occurred just before the performance was improved (step 140). Monitoring program 36 assumes that the reboot of this component lead to the improvement of performance of the application, system or service because of the proximity in time of the reboot to the correction of the problem. If the performance of the application, system or service has improved by a predetermined amount or to a predetermined percentage of the applicable service level metric by the reboot, then monitoring program 36 concludes that the reboot fixed the problem. Next, monitoring program 36 notifies the optimization program 38 as to the result and reboot processing is completed for this problem. Referring again to decision 138, no branch, where the reboot of the component did not substantially improve performance of the application, system or service for which a problem was noted, then monitoring program 36 records the foregoing results/data in Performance Table 43 and notifies the optimization program 38 as to the results (step 144). Also, optimization program 38 loops back to step 124 to notify reboot sequencing program 41 to reboot the next most cost-effective component calculated to correct the problem with this application, system or service (step 124). The foregoing steps 124-144 are repeated until the problem with the application, system or service (in the foregoing example, application 21) is corrected.

Figure 3:
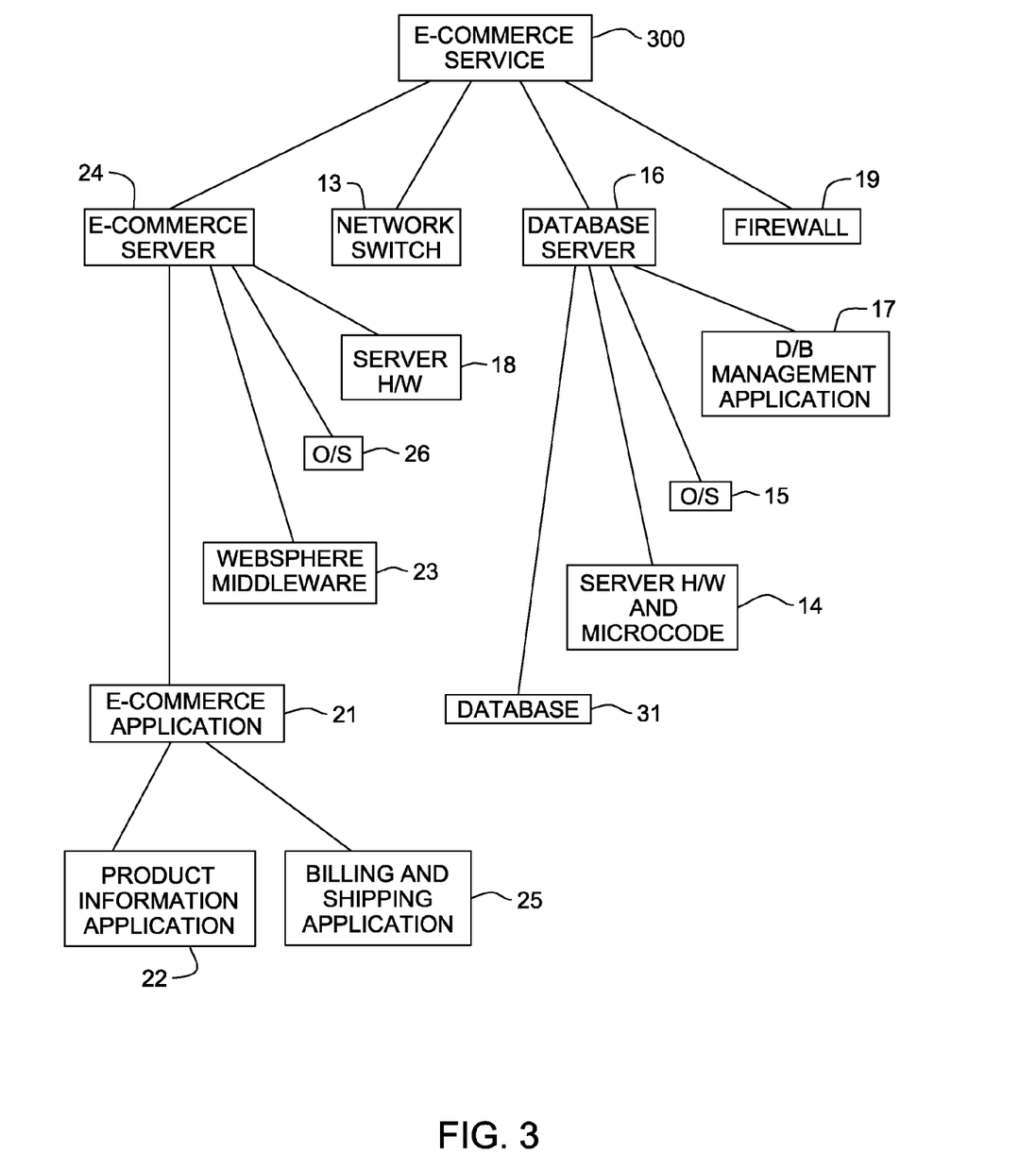
FIG. 3 is a hierarchical representation of hardware and software components within the distributed computer system of FIG. 1, used by the micro reboot optimization program of FIG. 2 to determine the optimum order to reboot the components within the distributed server system of FIG. 1.

In an alternate embodiment of the present invention illustrated in FIGS. 3, 4(A-F) and 5(A-B), optimization program 38 considers additional factors to determine the optimum order to reboot the components. These additional factors are based on a hierarchical representation of the distributed computer system as illustrated in FIGS. 3 and 4 (A-F). FIG. 3 illustrates a hierarchical tree structure, generated by optimization program 38, of an e-commerce service 300 provided by the e-commerce server 24 and database server 16 of FIG. 1. (E-commerce service 300 excludes the web service provided by web server 27 and database server 16, and also excludes the infrastructure management server 30). Because the e-commerce service 300 is the overall function presented to the clients, the e-commerce service 300 is the highest node in the tree structure of FIG. 3. To provide the e-commerce service, e-commerce server 24, database server 16, firewall 19 and network switch 13 must all be functional. They are all illustrated as children of the e-commerce service node 300 because they are all systems that can be rebooted separately, and are further divisible into functional units or components that can be rebooted separately. E-commerce server 24 can be logically divided into e-commerce application 21, Websphere middleware 23, operating system 26 and server hardware (including micro code) 18 components, which can each be rebooted separately. FIG. 3 illustrates these components 21, 23, 26 and 18, as the children of the e-commerce server 24. E-commerce application 21 can be logically divided into product information application 22 and billing and shipping application 25, and these are illustrated as the children of e-commerce application 21. Database server 16 can be logically divided into a database manager application 17 (such as IBM DB/2 or Oracle database manager), an operating system 15, server hardware (including micro code) 9 and database 31, which can each be rebooted (or reloaded in the case of the database 31) separately. These components are illustrated as the children of database server 16.

Figure 5A:
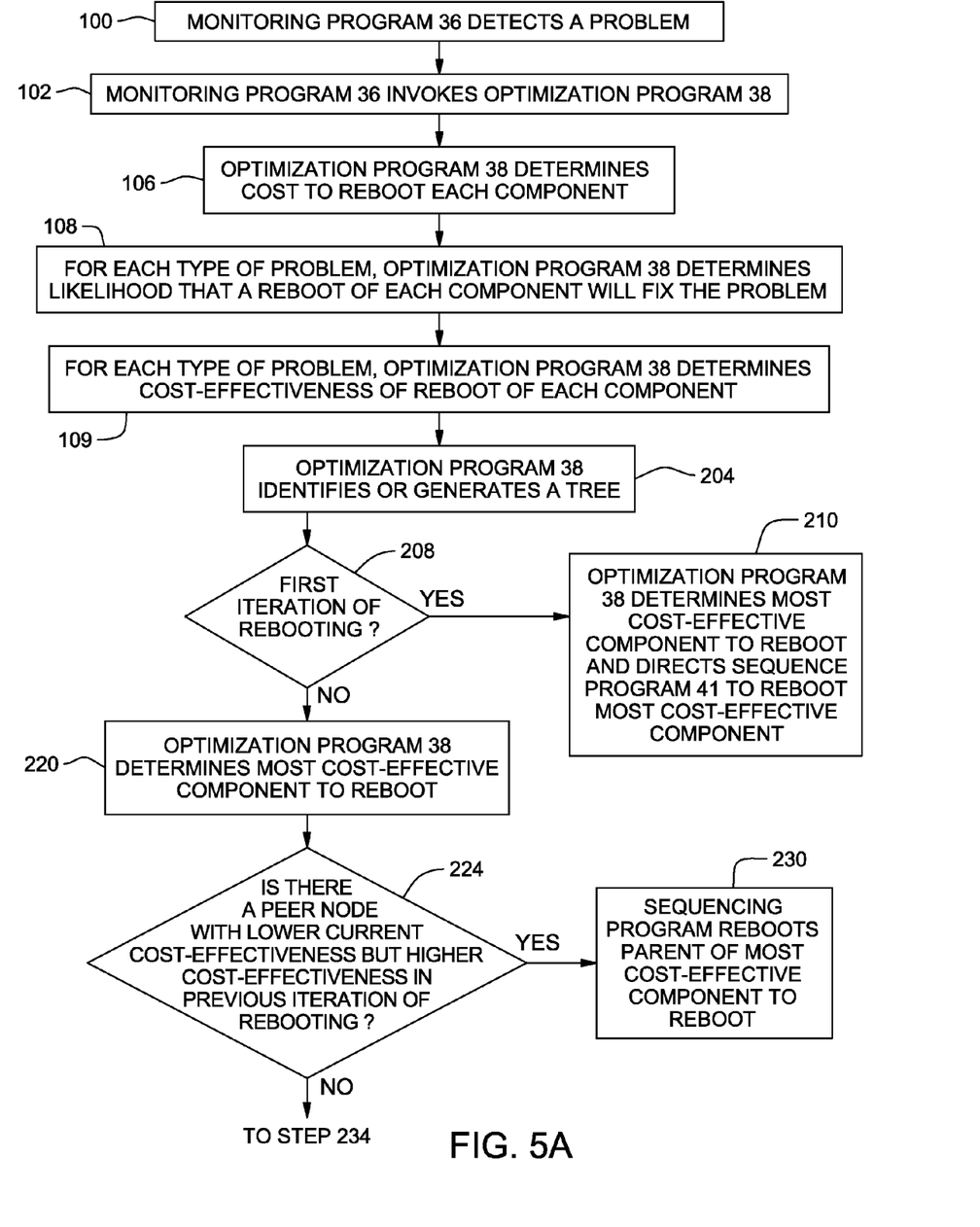
Figure 5B:
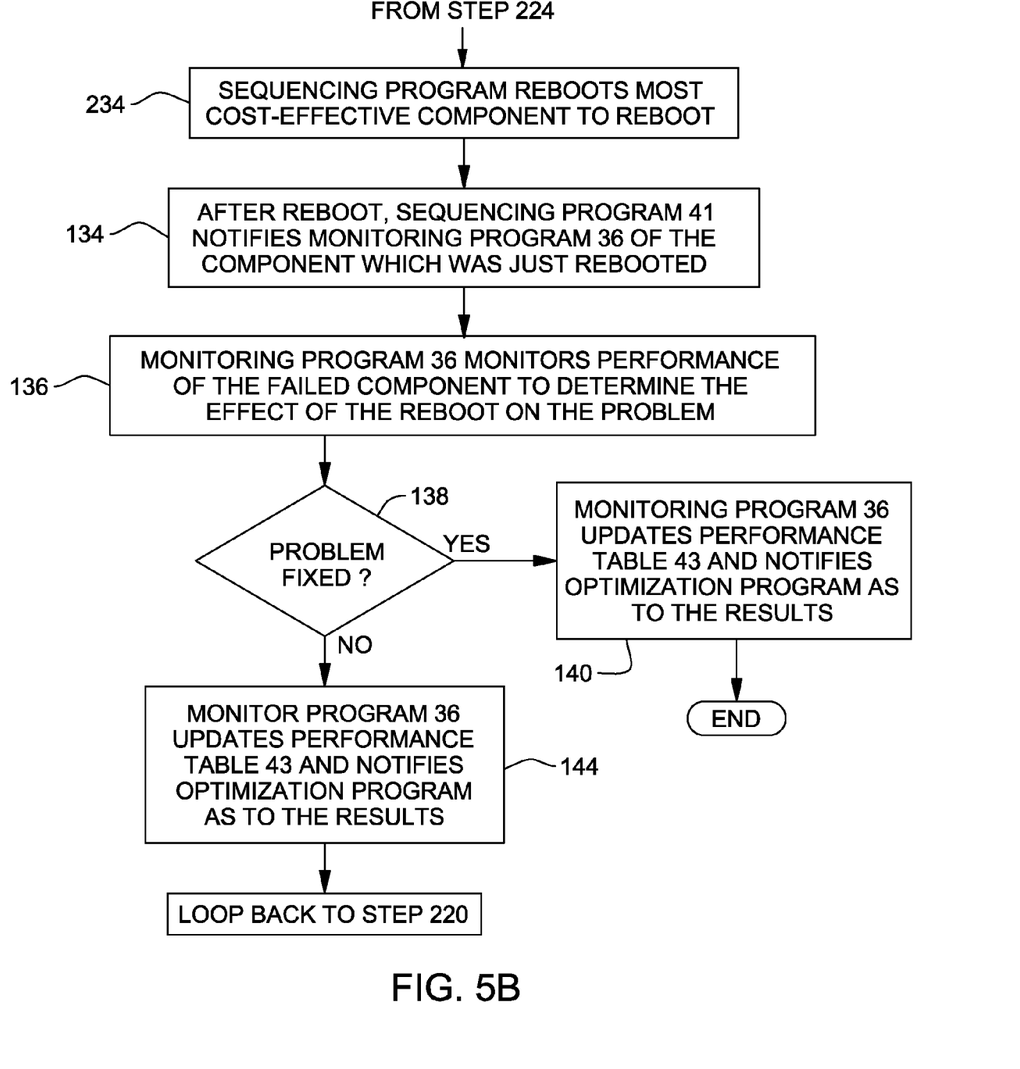

FIG. 5 (A-B) illustrate the alternate embodiment of the present invention. The alternate embodiment of the present invention comprises steps 100-109 and 134-144 of FIG. 2, but substitutes steps 204-234 for steps 110 and 124 of FIG. 2. After completing steps 100-109, reboot optimization program 38 identifies or generates a "tree" graph which represents the components associated with supporting each service, and their interdependencies (step 204). The tree graph is based on configuration information collected by the infrastructure configuration program 42. Each node in the tree (below the overall service) represents a hardware or software component in distributed server system 11, that the provisioning program 34 can independently reboot. In the illustrated example, the nodes of the tree supporting the e-commerce service 300 (as the parent node) are as follows: E-commerce server 24 is the child of e-commerce service 300 because a failure of e-commerce server 24 will prevent provision of e-commerce service 300. Database server 16 is the child of e-commerce service 300 because a failure of database server 16 will prevent provision of e-commerce service 300 (because e-commerce server 24 cannot get the data needed to provide the e-commerce service 300). Firewall 19 is the child of e-commerce service 300 because a failure in firewall 19 will prevent clients from accessing the e-commerce server 24 which is necessary to provide the e-commerce service 300. E-commerce application 21, Websphere middleware 23, operating system 26 and e-commerce application 21 and e-commerce server hardware 18 are children of e-commerce server 24 because a failure of anyone will prevent utilization of e-commerce server 24. Database management application 17, operating system 15, database server hardware (including micro code) 9 and database 31 are children of database server 16 because a failure in anyone will prevent utilization of database server 16.

In this alternate embodiment, optimization program 38 determines if this is the first iteration of rebooting to attempt to correct the current problem (decision 208). If so (decision 208 yes, optimization program 38 next determines the component which is most cost effective to reboot (in the manner described above) and notifies sequencing program 41 to reboot this component (step 210). If this is the second or subsequent iteration of rebooting to attempt to correct the current problem (decision 208, yes branch), then optimization program 38 determines the component which is most cost effective to reboot (in the manner described above) (step 220). Next, optimization program 38 determines if the component which is most cost effective to reboot (i.e. the "root" component) has a peer/sibling component that is less cost effective to reboot than the root component (decision 224). For example, in distributed server system 11, e-commerce server 24, database server 16, firewall 19 and network switch 13 are all peers/siblings. As another example, in distributed server system 11, e-commerce application 24, Websphere middleware 23, operating system 26, and server hardware 18 are all peers/siblings. As another example, in distributed server system 11, database management application 17, operating system 15, server hardware (including micro code) 9 and database 31 are all peers/siblings. If the component which is most cost effective to reboot (i.e. the "root" component) has a peer component that is currently less cost effective to reboot (decision 224, yes branch), and the peer component was rebooted during the prior iteration, then optimization program 38 notifies reboot sequencing program 41 to reboot the parent node of the root component and its peer (step 230). The reason is that the prior rebooting of the peer component did not fix the problem, and there is some correlation between the abilities of peer/sibling nodes to fix a problem. So, if the peer/sibling node did not fix the problem by being rebooted during the previous iteration, there is a reduced likelihood that rebooting of the root node will fix the problem during the current iteration. Referring again to decision 224, no branch where the component which is most cost effective to reboot (i.e. the "root" component) does not have a peer component that is currently less cost effective to reboot (decision 224, yes branch) and was rebooted during the previous iteration, then optimization program 38 directs sequencing program 41 to reboot the component which is most cost effective to reboot (step 234). Next, steps 134-144 of FIG. 2 are performed, and if the current reboot does not fix the problem, optimization program loops back to step 220.

FIG. 4 (A-F) illustrate an example of three iterations of the alternate embodiment of the present invention where the components are not necessarily rebooted in order of their cost-effectiveness (as in the first embodiment of the invention described above). FIG. 4 (A-H) show a tree graph illustrating a subset of components of distributed server system 11, i.e. e-commerce server 24 and its progeny and their relationship to each other. Only a subset of the hierarchical structure of FIG. 3 is illustrated in FIG. 4 (A-F) to simplify the explanation, and because there was a failure of e-commerce server 24 to provide its overall service. In this example, the highest node represents e-commerce server 24, the children of e-commerce server 24 are e-commerce application 21, Websphere middleware 23, operating system 26, and e-commerce server hardware (including micro code) 18, and the children of e-commerce application 21 are product information application 22 and billing and shipping application 25. These components are arranged into this tree graph because of the following: A failure of product information application 22 or billing and shipping application 25 will adversely impact the resultant e-commerce application 21. A failure of e-commerce server 24 can be based on a failure of e-commerce server 24 itself or a failure of any lower component in the tree structure (except that where redundant components exist, a failure of one redundant component will have a lesser impact on e-commerce server 24). The numbers shown in parenthesis inside each of the component boxes are examples of the Cost-Effectiveness score for the component during the current iteration.

Figure 4A:
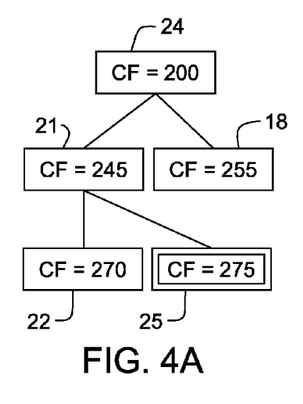
Figure 4B:
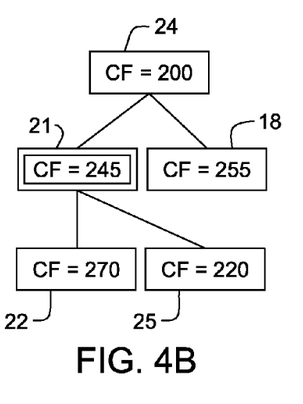
Figure 4C:
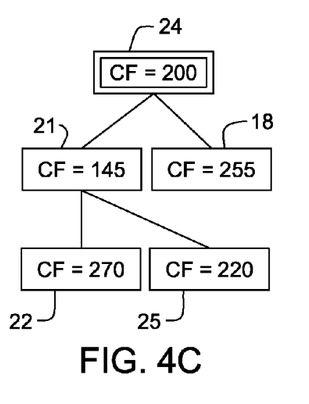
Figure 4D:
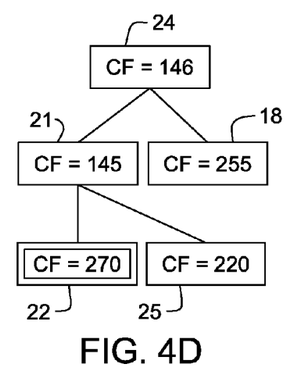
Figure 4E:
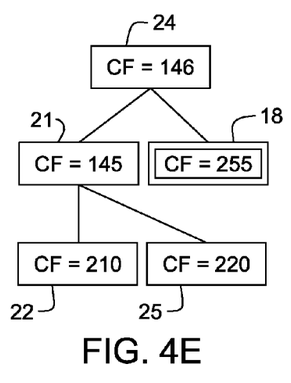
Figure 4F:
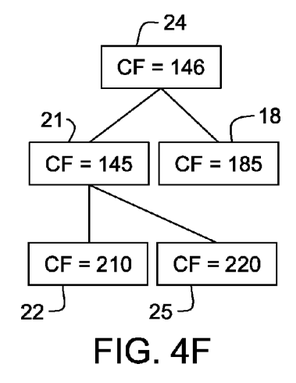

During the first iteration of rebooting as illustrated in FIG. 4(A), the most cost-effective component to reboot is billing and shipping application 25 with a current Cost-Effectiveness score in Table 45 equal to 275. So, during the first iteration, optimization program 38 notifies sequencing program 41 to reboot billing and shipping application 25. Then, monitoring program 36 reports the results to the optimization program 38. In the illustrated example, the reboot of billing and shipping application 25 fails to correct the problem so the optimization program 38 updates Table 45 with a lower Cost-Effectiveness score for billing and shipping application 25 for fixing the current problem, i.e. a failure of e-commerce server 24. The result is graphically illustrated in FIG. 4(B). As illustrated in FIG. 4(B), the current Cost-Effectiveness for billing and shipping application 25 is now "220" (i.e. a reduction from "275") for a failure of e-commerce server 24. For the next iteration of rebooting, the most cost-effective component to reboot is product information application 22 with a Cost-Effectiveness score of "270". However, because the Cost-Effectiveness of the peer node of product information application 22, i.e. billing and shipping application 25, was rebooted during the prior iteration and currently has a lower Cost-Effectiveness than that of product information application 22, then optimization program 38 will select their parent node 21 as the next node to reboot even though product information application 22 has a higher Cost-Effectiveness score than product information application 22. The reason that optimization program 38 did not select product information application 22 as the next (second) node to reboot is because the reboot of billing and shipping application 25 failed to fix the problem and in many cases, there is some correlation between sibling nodes in their ability to fix a problem with a higher node in the hierarchy. So, if one sibling did not fix the problem, it is less likely that another sibling of the same parent will fix the same problem. In the illustrated example, the reboot of parent node 21 does not fix the problem, so optimizing program 38 updates Table 45 with a lower Cost-Effectiveness score for e-commerce application 21 for fixing the current problem. The result is graphically illustrated in FIG. 4(C). As illustrated in FIG. 4(C), the current Cost-Effectiveness for e-commerce application 21 is now "145" (i.e. a reduction from "245"). For the next iteration of rebooting, optimization program 38 will select server hardware (including micro code) 18 to reboot because its Cost-Effectiveness score is higher than the current and previous iteration Cost-Effectiveness scores of e-commerce application 21; Under these conditions, optimization program 38 does not select parent node 24 to reboot next. If the reboot of parent node 24 does not fix the problem, then optimization program 38 updates the Cost-Effectiveness for rebooting the e-commerce server. The results are illustrated in FIG. 4(D). Next, optimization program 38 loops back to step 124 because node 24 is the highest node in the tree structure and its reboot did not fix the problem. For the next iteration, optimization program 38 will select node 22 to reboot because it currently has the highest Cost Effectiveness score of "270", and was not rebooted during the first ascension of the tree structure. If the reboot of node 22 does not fix the problem, then optimization program 38 will decrease the Cost-Effectiveness score for node 22, for example, to "190", as illustrated in FIG. 4(E). Next, optimization program 38 will select node 18 to reboot because it is the only node that has not yet been rebooted in an attempt to fix the current problem. If the reboot of node 18 does not fix the problem, then optimization program 38 will decrease its Cost-Effectiveness score, for example, to 175, as illustrated in FIG. 4(F).

When adjusting the Cost-Effectiveness score of each component/node after failure of the reboot of the component/node to fix the problem, optimization program 38 determines the amount to decrease the existing Cost-Effectiveness score based on the following: the lesser the amount of improvement, the greater the reduction to the Cost-Effectiveness score. (The cost to reboot does not change; however, the likelihood that the reboot will fix the problem decreases.)

Policy program 32, provisioning program 34, monitoring program 36, micro reboot optimization program 38, reboot sequencing program 41 and infrastructure configuration program 42 can be loaded into server 30 from a computer readable storage media 77 such as magnetic tape or disk, optical disk, DVD, semiconductor memory, memory stick, etc.

Based on the foregoing, a system, method and program for selectively rebooting computers and other components of a distributed computer system have been disclosed. However, numerous modifications and substitutions can be made without deviating from the scope of the present invention. For example, the components of the system could be individual manageable modules within an application rather than infrastructure level components. Therefore, the present invention has been disclosed by way of illustration and not limitation, and reference should be made to the following claims to determine the scope of the present invention.

What is claimed is:

1. A method for selectively rebooting components of a computer system, said method comprising the steps of:
   generating one or more tables which list respective costs to reboot said components and respective likelihoods that reboots of the respective components will correct respective problems with said computer system, wherein each of said costs is based on a time to reboot or delays caused by said reboot of the respective component;
   in response to a subsequent problem with said computer system, a server determining from said table an order to reboot components of said computer system based on said costs and likelihoods that the reboot will correct said problem, such that a component of said computer system characterized by a relatively low cost and high likelihood to correct said problem will be rebooted before another component characterized by a relatively high cost and low likelihood to correct said problem;
   rebooting a first component in said order;
   after rebooting said first component in said order, the server determining an extent to which the reboot of said first component corrected said problem, and the server updating said one or more tables accordingly; and
   in response to a subsequent problem with said computer system, the server determining from the one or more updated tables an order to reboot components of said computer system based on said costs and likelihoods that the reboot will correct said problem, such that a component of said computer system characterized by a relatively low cost and high likelihood to correct said problem will be rebooted before another component characterized by a relatively high cost and low likelihood to correct said problem.

2. A method as set forth in claim 1 wherein said problem is a problem with an application program.

3. A method as set forth in claim 1 wherein
   said components are arranged hierarchically as children components and/or parent components, where children components of each parent component impact performance of said each parent component; and
   in response to said subsequent problem with said computer system, the step of the server determining from said table an order to reboot components of said computer system is also based on whether a sibling component of the component which has a relatively low cost and high likelihood to correct said problem was rebooted in response to the first said problem, and failed to correct the problem.

4. A server for selectively rebooting components of a computer system, said server comprising:
   a CPU, a computer readable memory and a computer readable storage media;
   first program instructions to generate one or more tables which list respective costs to reboot said components and respective likelihoods that reboots of the respective components will correct respective problems with said computer system, wherein each of said costs is based on a time to reboot or delays caused by said reboot of the respective component;
   second program instructions, responsive to a subsequent problem with said computer system, to determine from said table an order to reboot components of said computer system based on said costs and likelihoods that the reboot will correct said problem, such that a component of said computer system characterized by a relatively low cost and high likelihood to correct said problem will be rebooted before another component characterized by a relatively high cost and low likelihood to correct said problem;

third program instructions to initiate rebooting of a first component in said order;

fourth program instructions, responsive to rebooting said first component in said order, to determine an extent to which the reboot of said first component corrected said problem, and update said one or more tables accordingly; and wherein said second program instructions responds to a subsequent problem with said computer system, by determining from the one or more updated tables an order to reboot components of said computer system based on said costs and likelihoods that the reboot will correct said problem, such that a component of said computer system characterized by a relatively low cost and high likelihood to correct said problem will be rebooted before another component characterized by a relatively high cost and low likelihood to correct said problem; and wherein said first, second, third and fourth program instructions are stored on said computer readable storage media for execution by said CPU via said computer readable memory.

5. A server as set forth in claim 4 wherein said problem is a problem with an application program.

6. A server as set forth in claim 4 wherein said components are arranged hierarchically as children components and/or parent components, where children components of each parent component impact performance of said each parent component; and in response to said subsequent problem with said computer system, the second program instructions determines from said table an order to reboot components of said computer system based in part on whether a sibling component of the component which has a relatively low cost and high likelihood to correct said problem was rebooted in response to the first said problem, and failed to correct the problem.

7. A computer program product for selectively rebooting components of a computer system, said computer program product comprising:

a computer readable storage media;

first program instructions to generate one or more tables which list respective costs to reboot said components and respective likelihoods that reboots of the respective components will correct respective problems with said computer system, wherein each of said costs is based on a time to reboot or delays caused by said reboot of the respective component;

second program instructions, responsive to a subsequent problem with said computer system, to determine from said table an order to reboot components of said computer system based on said costs and likelihoods that the reboot will correct said problem, such that a component of said computer system characterized by a relatively low cost and high likelihood to correct said problem will be rebooted before another component characterized by a relatively high cost and low likelihood to correct said problem;

third program instructions to initiate rebooting of a first component in said order;

fourth program instructions, responsive to rebooting said first component in said order, to determine an extent to which the reboot of said first component corrected said problem, and update said one or more tables accordingly; and wherein said second program instructions responds to a subsequent problem with said computer system, by determining from the one or more updated tables an order to reboot components of said computer system based on said costs and likelihoods that the reboot will correct said problem, such that a component of said computer system characterized by a relatively low cost and high likelihood to correct said problem will be rebooted before another component characterized by a relatively high cost and low likelihood to correct said problem; and wherein said first, second, third and fourth program instructions are stored on said computer readable storage media.

8. A computer program product as set forth in claim 7 wherein said problem is a problem with an application program.

9. A computer program product as set forth in claim 7 wherein said components are arranged hierarchically as children components and/or parent components, where children components of each parent component impact performance of said each parent component; and said second program instructions responds to said subsequent problem with said computer system, by determining from said table an order to reboot components of said computer system and makes the determination based in part on whether a sibling component of the component which has a relatively low cost and high likelihood to correct said problem was rebooted in response to the first said problem, and failed to correct the problem.

\* \* \* \* \*